United States Patent
Kakutani et al.

(10) Patent No.: US 6,983,657 B1
(45) Date of Patent: Jan. 10, 2006

(54) LOAD DETECTING SYSTEM AND AUTOMATIC WASHING MACHINE EQUIPPED WITH A SYSTEM FOR DETECTING THE MAGNITUDE OF THE LOAD ACTING ON A MAGNETOSTRICTIVE ELEMENT

(75) Inventors: Kazushige Kakutani, Moriguchi (JP); Keiji Kishimoto, Hirakata (JP); Kazunobu Yokotani, Hirakata (JP); Hideaki Aoki, Kyoto (JP); Kazufumi Ushijima, Hirakata (JP); Takeshi Fukunaga, Hyogo (JP); Minoru Nakanishi, Otsu (JP); Fumitake Kondo, Otsu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 10 days.

(21) Appl. No.: 10/049,000

(22) PCT Filed: Aug. 28, 2000

(86) PCT No.: PCT/JP00/05810

§ 371 (c)(1), (2), (4) Date: Feb. 20, 2002

(87) PCT Pub. No.: WO01/18514

PCT Pub. Date: Mar. 15, 2001

(30) Foreign Application Priority Data

Sep. 2, 1999 (JP) .................................. 11-249032

(51) Int. Cl.
G01B 7/16 (2006.01)
G01L 1/00 (2006.01)

(52) U.S. Cl. ........................................................ 73/779

(58) Field of Classification Search .................. 73/779, 73/862.333, 862.332, 862.334, 862.69, 862.61, 73/862.336; 324/209, 223; 361/152
See application file for complete search history.

(56) References Cited

U.S. PATENT DOCUMENTS

| | | | | |
|---|---|---|---|---|
| 4,811,609 A | * | 3/1989 | Nishibe et al. | 73/862.36 |
| 4,931,729 A | * | 6/1990 | Pratt | 324/209 |
| 5,146,790 A | * | 9/1992 | Fish | 73/862.336 |
| 5,198,764 A | * | 3/1993 | Spencer | 324/207.26 |
| 5,400,656 A | * | 3/1995 | Schiessle et al. | 73/779 |
| 5,850,045 A | * | 12/1998 | Harada et al. | 73/862.333 |
| 6,047,605 A | * | 4/2000 | Garshelis | 73/862.336 |
| 6,094,995 A | * | 8/2000 | Odachi et al. | 73/862.333 |
| 6,249,418 B1 | * | 6/2001 | Bergstrom | 361/152 |

* cited by examiner

Primary Examiner—Max Noori
Assistant Examiner—Octavia Davis
(74) Attorney, Agent, or Firm—Westerman, Hattori, Daniels & Adrian, LLP

(57) ABSTRACT

The invention provides a load detecting system comprising a core (83) of magnetostrictive material, a coil (85) disposed in the vicinity of the core, and a load detecting circuit (10) connected to the coil (85) for detecting the magnitude of a load acting on the core (83). The load detecting circuit (10) comprises an exciting circuit (102) for passing an a.c. detecting current through the coil (85), a pulse current generating circuit (103) for passing through the coil a detection preparing current having a current value greater than the maximum value of the detecting current, a change-over circuit (104) for effecting a change-over between the exciting circuit (102) and the pulse current generating circuit (103) to pass the detecting current through the coil after passing the detection preparing current therethrough, and a microcomputer (100) for deriving the magnitude of the load acting on the magnetostrictive element based on an impedance variation produced in the coil during the period of passage of the detecting current through the coil.

9 Claims, 11 Drawing Sheets

LOAD DETECTING SYSTEM AND AUTOMATIC WASHING MACHINE EQUIPPED WITH A SYSTEM FOR DETECTING THE MAGNITUDE OF THE LOAD ACTING ON A MAGNETOSTRICTIVE ELEMENT

TECHNICAL FIELD

The present invention relates to load detecting systems for detecting the magnitude of a load acting on a magnetostrictive element based on the variation of impedance of a coil, and to automatic washing machines adapted to control the laundering operation thereof by detecting the load of laundry and washing water by the load detecting system.

BACKGROUND ART

Magnetostrictive elements have such a property that the element has its magnetic permeability varied and is deformed by the variation of the magnetic permeability when subjected to a magnetic field by passing current through a coil disposed in the vicinity of the element. The magnetostrictive element is used as an actuator or oscillator since the amount of deformation and the stress produced due to the deformation are great.

Conversely when the magnetostrictive element is deformed by applying an external force thereto, the element has its magnetic permeability altered by the deformation. For example, JP-U No. 1-105834(1989) discloses a load sensor for detecting the magnitude of an external force by utilizing these characteristics. The sensor comprises a magnetostrictive element, two primary coils provided around the element, and a secondary coil magnetically coupled to one of the primary coils by the magnetostrictive element to provide a differential transformer for detecting a load acting on the magnetostrictive element.

The load sensor is seviceable as a high-sensitivity sensor since great variations in electrical impedance are available in the load detecting range owing to the characteristics of the magnetostrictive element.

Although adapted to realize high sensitivity, such a load sensor has the problem of being great in hysteresis because the magnetostrictive element itself has great energy of crystal magnetic anisotropy to thereby impair the accuracy of detection.

Especially when the load sensor is to be used for washing machines, there is a need to measure the combined weight of laundry weighing hundreds of grams to several kilograms and water of tens of kilograms. Accordingly, the sensor must have a broad load detecting range, whereas the sensor has the problem that the influence of hysteresis markedly appears in the range of small loads to be measured, consequently making it impossible to obtain sufficiently high accuracy of detection.

An object of the present invention is to provide a load detecting system comprising a magnetostrictive element which is reduced in the influence of hysteresis thereof to accurately detect the load acting thereon, and an automatic washing machine having such a highly accurate load detecting system.

DISCLOSURE OF THE INVENTION

The present invention provides a load detecting system comprising a magnetostrictive element to be acted on by a load to be measured, a coil disposed in the vicinity of the magnetostrictive element, and a detecting circuit connected to the coil for detecting the magnitude of the load acting on the magnetostrictive element.

The detecting circuit comprises:

detecting means for passing an a.c. detecting current through the coil, detection preparing means for passing through the coil a detection preparing current having a current value greater than the maximum value of the detecting current, control means for controlling the detecting means and the detection preparing means to pass the detecting current through the coil after passing the detection preparing current therethrough, and calculation processing means for deriving the magnitude of the load acting on the magnetostrictive element based on an impedance variation produced in the coil during the period of passage of the detecting current through the coil.

With the load detecting system of the invention described, detection preparing current is passed through the coil first, and the detecting current is thereafter passed through the coil. The magnitude of the load acting on the magnetostrictive element is detected based on the impedance variation of the coil while the coil is being energized by the passage of the detecting current.

Since the detection preparing current has a current value greater than the maximum value of the detecting current, the passage of the detection preparing current deforms the magnetostrictive element in such a direction as to offset the strain thereof caused by the action of the load. The detecting current is thereafter passed through the coil, whereby the magnetostrictive element resumes strain corresponding to the load acting thereon. Thus, every time the load is to be detected, the element is deformed once in such a direction as to nullify the load, thereafter deformed in the same direction and eventually given an amount of deformation corresponding to the magnitude of the load. This eliminates the likelihood that every load detected will involve a variation due to the influence of residual magnetism attributable to hysteresis, consequently ensuring high accuracy of detection.

Stated specifically, the detecting means comprises current generating means for producing the detecting current to be passed through the coil. In this case, the detecting current is passed through the coil, and the impedance of the coil is altered in corresponding relation with the load.

Alternatively, the detecting means can be provided by voltage generating means for producing detecting voltage for passing the detecting current through the coil. In this case, the detecting voltage is applied to the coil, whereby detecting current is passed through the coil to alter the impedance of the coil in corresponding relation with the load.

The detection preparing means determines a maximum value for the detection preparing current at a level equivalent to or greater than the current value for altering the amount of strain of the magnetostrictive element at the maximum value of the effective load detecting range of the system to the amount of strain at the minimum value thereof. The magnetostrictive element is then deformed with the detection preparing current once to the amount of strain at the maximum value of the effective load detecting range or to a greater amount of strain, and thereafter resumes an amount of strain corresponding to the acting load. Accordingly, the magnetostrictive element deforms always in the same direction regardless of the magnitude of the load acting thereon, consequently exhibiting an amount of strain corresponding to the load.

Further stated specifically, the detection preparing current has a waveform rising with a gradual increase and thereafter falling with a gradual decrease. This renders the magnetostrictive element deformable gently by the passage of the detection preparing current through the coil.

Further stated specifically, the control means passes the detection preparing current through the coil, then interrupts the passage of the current for a specified period of time and thereafter passes the detecting current through the coil. This makes abrupt contraction or expansion of the element moderate to suppress noise of collision to be produced upon the magnetostrictive element colliding with a member positioned around the element. Further when the detection preparing current is changed over to the detecting current by the control means with a specified time constant, the occurrence of the noise of collision can be suppressed effectively.

Further stated specifically, the detecting means detects the magnitude of the load acting on the magnetostrictive element based on the impedance variation of the coil upon lapse of a predetermined period time after the passage of the detection preparing current through the coil. When the predetermined period of time thus provided is long enough to cause the magnetostrictive element as deformed by the detection preparing current to resume the amount of strain corresponding to the load, the load can be detected with the element deformed in a stabilized state.

The present invention provides an automatic washing machine which has the load detecting system of the invention described as disposed in a position for receiving the load of laundry and washing water. The load of the laundry weighing hundreds of grams to several kilograms and washing water weighing tens of kilograms can be detected accurately by the detecting system to control the laundering operation in response to the resulting detection signal.

The load detecting system of the present invention is adapted to accurately detect the load acting on the magnetostrictive element with the influence of hysteresis of the element diminished, and the automatic washing machine equipped with such an accurate load detecting system is adapted for an accurately controlled laundering operation.

BEST MODE OF CARRYING OUT THE INVENTION

Figure 1:
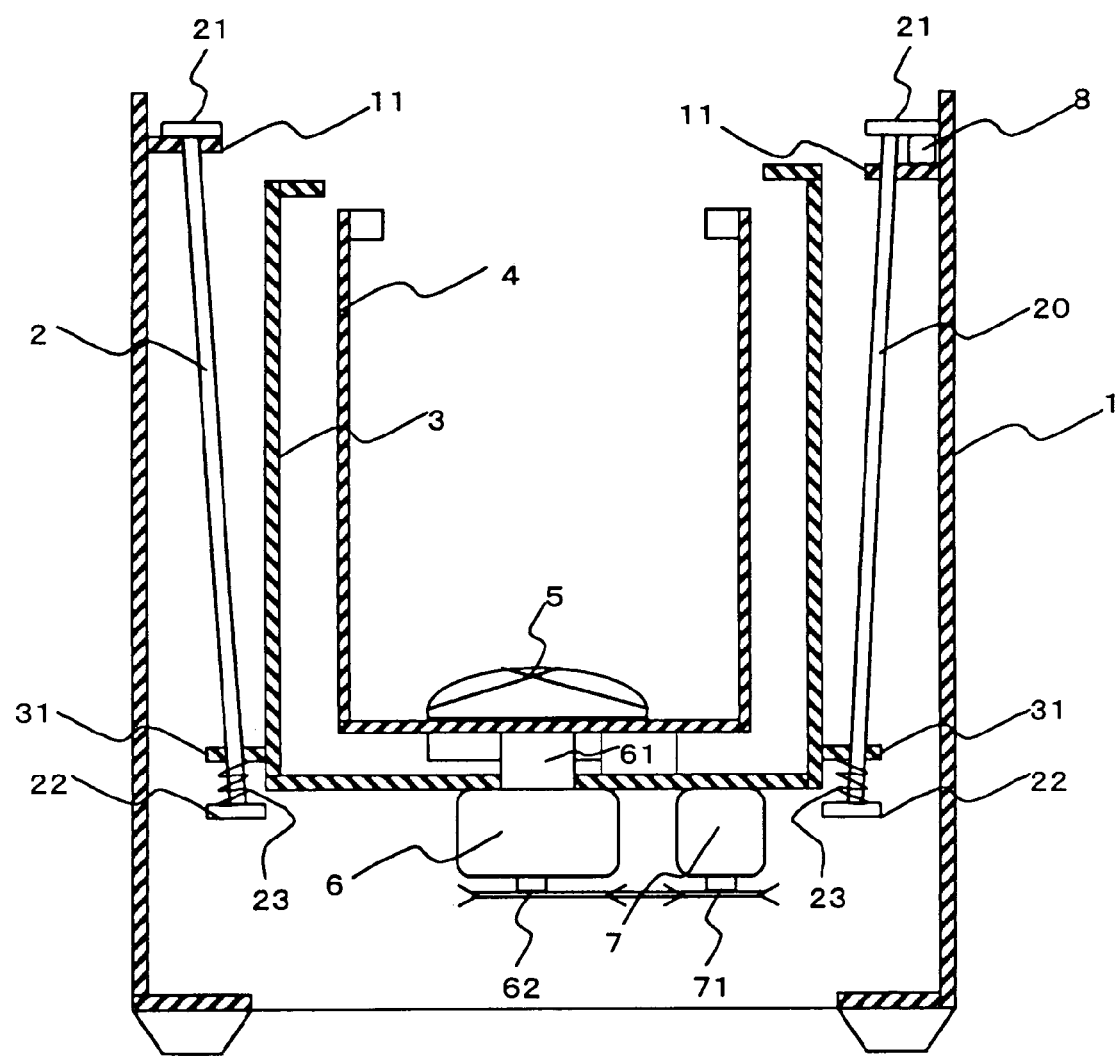
FIG. 1 is a view in section schematically showing the construction of an automatic washing machine having a load detecting system of the invention.

With reference to the drawings, a detailed description will be given of an embodiment, i.e., an automatic washing machine equipped with a load detecting system of the invention.

The automatic washing machine of the present embodiment has an outer tub 3 supported in suspension by four suspending rods 2, 20 inside a casing 1. Provided inside the outer tub 3 is an inner tub 4 for laundering and dewatering.

A casing bracket 11 is provided at each of four upper corners of the casing 1, and an outer tub bracket 31 is provided at each of four lower corners of the outer tub 3. Disposed at the upper end of each suspending rods 2 or 20 is an upper bracket 21 for holding the suspending rod 2 or 20 to the casing bracket 11. Provided at the lower end of the suspending rod 2 or 20 is a lower bracket 22 for holding the suspending rod 2 or 20 to the outer tub bracket 31.

Interposed between the upper surface of each lower bracket 22 for the suspending rod 2 or 20 and the lower surface of the outer tub bracket 31 is a coil spring 23 which contracts or expands in accordance with the load acting on the outer tub 23, whereby the outer tub 3 is elastically supported with the suspending rod 2, 20 on the casing 1 to absorb the vibration of the outer tub 3 so that the vibration will not be delivered directly to the casing 1.

A load sensor 8 is provided for the suspending rod 20 included among the four rods 2, 20 and positioned between the lower surface of the upper bracket 21 and the upper surface of the casing bracket 11 for detecting the load acting on the outer tub 3. Accordingly, the load acting on the load sensor 8 is approximately a quarter of the actual load on the outer tub 3. The maximum value of the effective detecting range of the load sensor 8 is set at 20 kg, so that the sensor can measure up to a maximum of 80 kg of laundry and washing water in combined weight.

Figure 2:
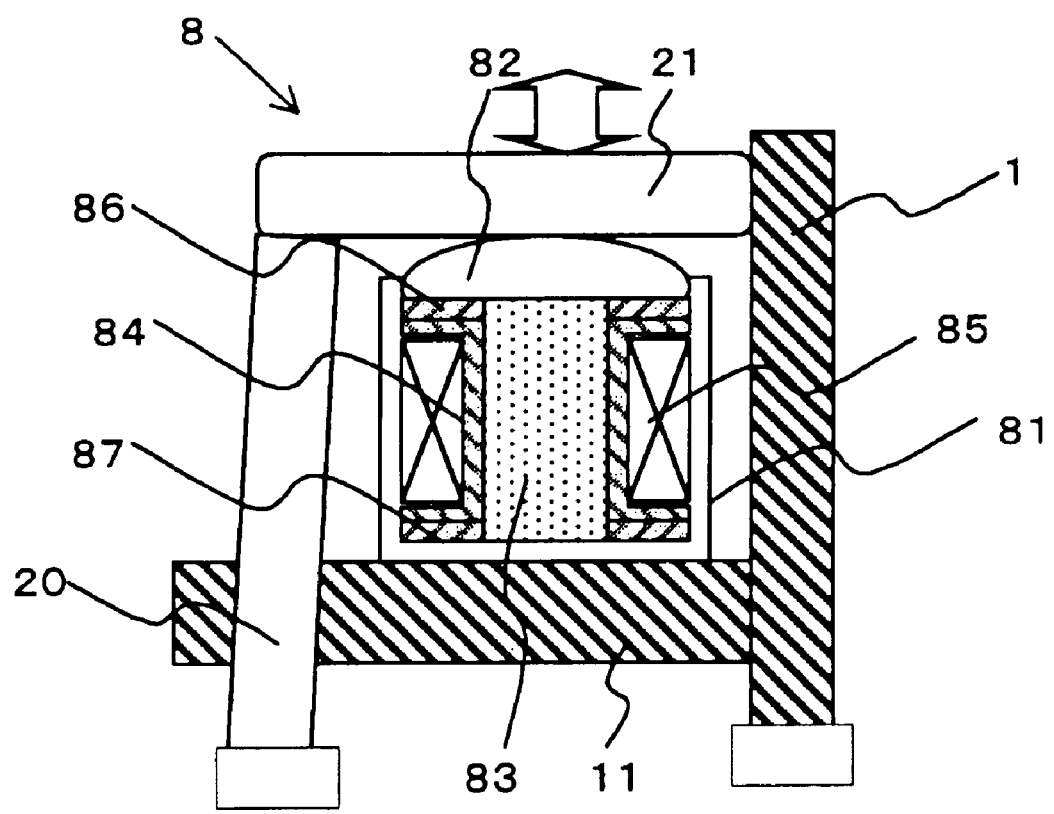
FIG. 2 is an enlarged view in section of the load detecting system included in the washing machine.

As shown in FIG. 2, the load sensor 8 comprises a solid cylindrical core (magnetostrictive element) 83 of magnetostrictive material, a bobbin 84 fitted around the core 83, and a detecting coil 85 provided around the bobbin 84. An elastic ring 86 of rubber is provided on the upper wall of the bobbin 84, and an elastic ring 87 similarly made of rubber is provided beneath the bottom wall of the bobbin 84.

The core 83, bobbin 84, detecting coil 85 and elastic rings 86, 87 are housed in a cuplike case 81, with a closure 82 provided over an upper opening of the case 81. The closure 82 has a spherical surface for contact with the upper bracket 21 for the rod 20, whereby the load acting on the upper bracket 21 of the rod 20 is received at a point so as to cause the load to act uniformly on the entire end face of the core 83.

With reference to FIG. 1, a bearing 6 is attached to the rear side of the outer tub 3, and a rotary shaft 61 rotatably supported by the bearing has an upper end to which the bottom portion of the inner tub 4 is connected. A pulsator 5 is rotatably provided on the bottom of the inner tub and connected to the rotary shaft 61.

A drive motor 7 is attached also to the rear side of the outer tub 3 and coupled to the pulsator 5 and the dewatering tub 4 by a belt reeved around pulleys 71, 62 for rotating the pulsator 5 forward and reversely for laundering and rinsing and for rotating the pulsator 5 and the dewatering tub 4 at a high speed in a definite direction for dewatering.

The detecting coil 85 of the load sensor 8 outputs a signal, which is fed to a control circuit (not shown) for controlling the laundering operation to detect the weight of laundry or the combined weight of laundry and washing water. The laundering operation is controlled based on the result. For example when the automatic washing machine is adapted to launder, rinse and dewater clothes automatically, the load of laundry placed in the inner tub 4 is detected before starting laundering, and an appropriate amount of water for the load is automatically determined. In the subsequent step of pouring water into the outer tub 3, the combined weight including the weight of water placed into the outer tub 3 is detected, and the supply of water is discontinued automatically based on the result when the predetermined appropriate amount of water has been placed in. Further in dehydrating or dewatering the laundry, the weight of the laundry in the inner tub 4 is detected to detect the dewatered state of the laundry from the weight to automatically set an appropriate period of dewatering time in accordance with the state.

Figure 3:
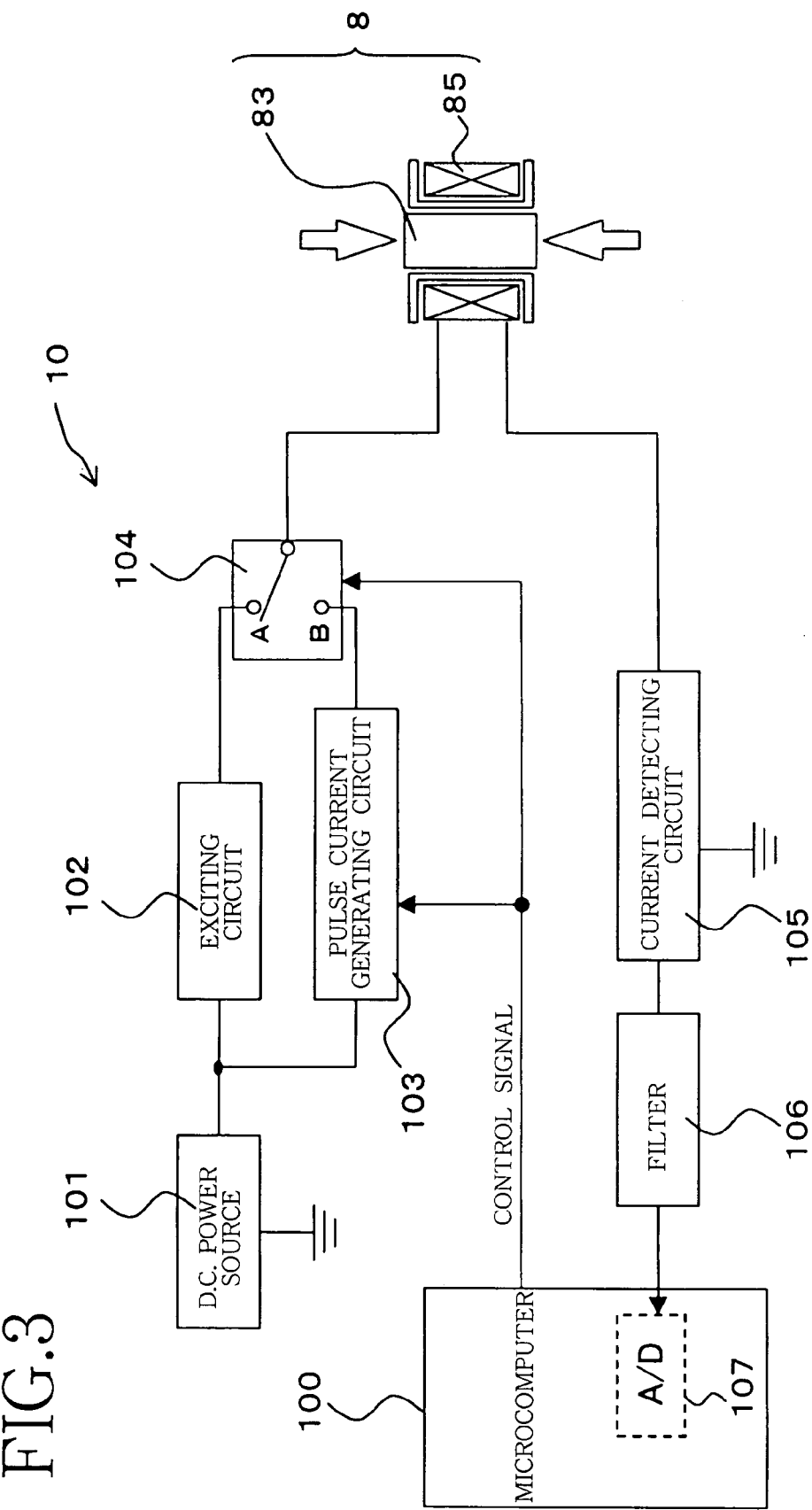
FIG. 3 is a block diagram showing the construction of the load detecting system of the invention.

Next, the construction of the load detecting circuit 10 to be connected to the load sensor 8 will be described. As shown in FIG. 3, the load detecting circuit comprises a d.c. power source 101, an exciting circuit 102 and a pulse current generating circuit 103 which are connected to the output terminal of the power source 101, a change-over circuit 104 comprising a switching element for selectively changing the current to be supplied to the detecting coil 85, a current detecting circuit 105 connected to the output terminal of the detecting coil 85, and a microcomputer 100 connected to the output terminal of the current detecting circuit 105 via a filter 106.

The exciting circuit 102 is adapted to produce a rectangular-wave voltage [see FIG. 4(a)] which goes on and off with a frequency of 16 kHz from a 5-V d.c. current delivered from the power source 101. The pulse current generating circuit 103 produces a pulse current with a peak value of 800 mA based on a control signal [see FIG. 4(b)] from the microcomputer 100. The peak value of the pulse current to be output from the circuit 103 is set at a current value sufficient to alter the amount of strain produced in the core 83 by the weight (tens of kilograms) of laundry and washing water to an amount of strain in a load-free state.

The change-over circuit 104 is changed over in response to a control signal from the microcomputer 100 to selectively connected one of the output terminal (terminal A) of the exciting circuit 102 and the output terminal (terminal B) of the pulse current generating circuit 103 to the detecting coil 85. The change-over circuit 104 is so adapted as to be connected to the terminal A in a default state, and is connected alternatively to the terminal B only for a period of 1 ms with a cycle of once every 500 ms under the control of the microcomputer 100. As timed with this mode of control, a pulse current is output from the circuit 103.

Consequently passed through the detecting coil 85 is a current of sawtooth waveform (detection preparing current) as shown in FIG. 4(c) and involving a delay in accordance with a time constant which is determined by the impedance of the detecting coil 85 and the resistance value of the current detecting circuit 105. With reference to the same drawing, the section a corresponds to the period (499 ms) during which the change-over circuit 104 is connected to the terminal A, and the section b to the period (1 ms) of connection of the circuit 104 to the terminal B.

The current detecting circuit 105 is adapted to output the current flowing through the detecting coil 85, as converted to a voltage corresponding to the magnitude of the current, and can be provided by using, for example, a current detecting shunt resistor. The filter 106 delivers a d.c. analog voltage by smoothing the input voltage. When the load acting on the core 83 alters, the impedance of the detecting coil 85 varies to consequently vary the current flowing through the detecting coil as indicated in a broken line in FIG. 4(c). The analog voltage to be delivered from the filter 106 therefore also varies.

The microcomputer 100 has incorporated therein an A/D converter 107, which samples the analog voltage input from the current detecting circuit 105 via the filter 106 every 500 ms and outputs a digital signal in accordance with the sampled voltage value. The A/D converter 107 samples the voltage upon lapse of 20 ms after the fall of a control signal from the microcomputer 100.

The microcomputer 100 includes a memory (not shown) having stored therein the relationship between the load acting on the core 83 and the output voltage value of the A/D converter 107, as expressed in the form of a function or table. Accordingly, the load acting on the core 83 is derived from the output value of the A/D converter 107 based on the relationship.

Figure 5:
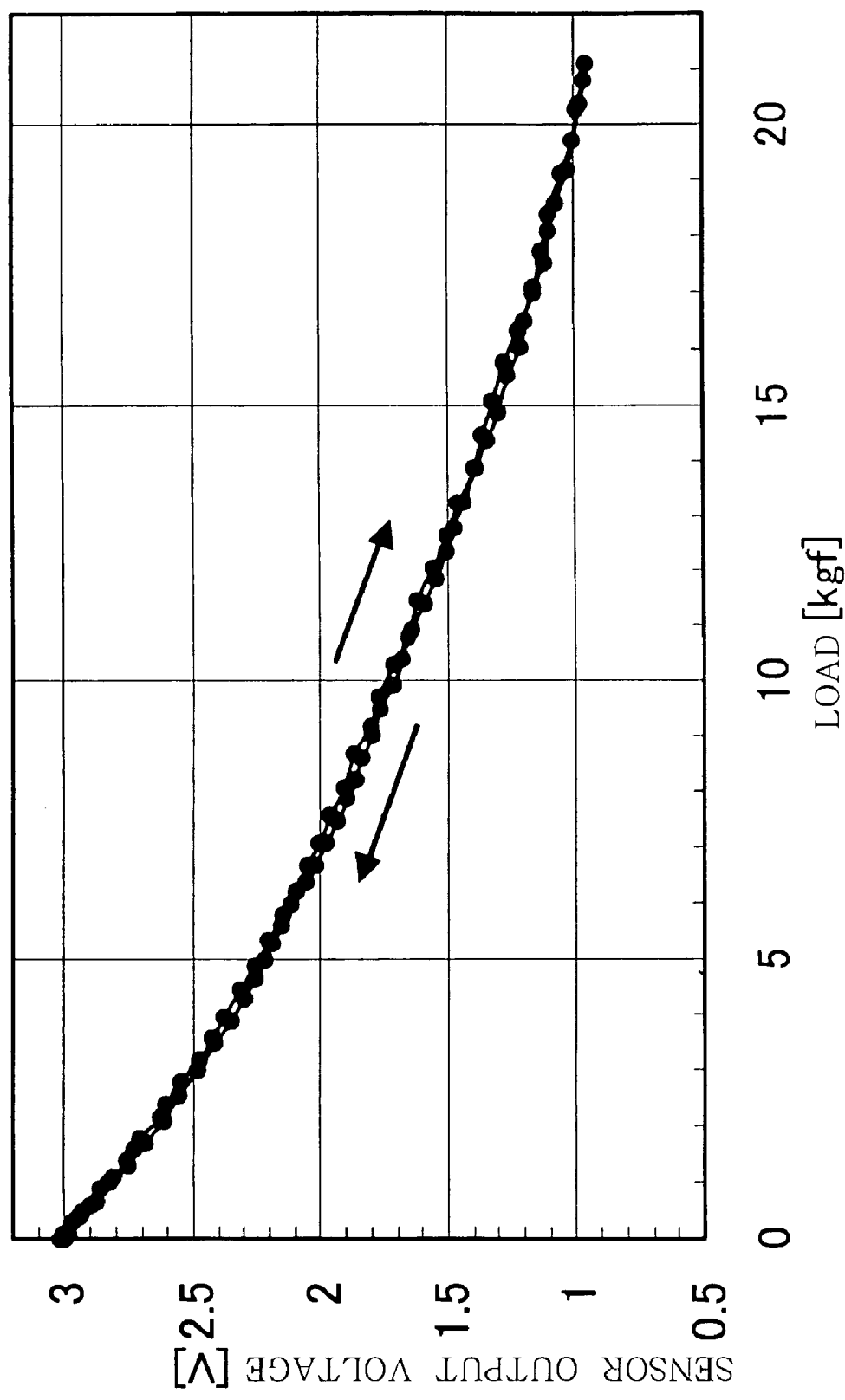
FIG. 5 is a graph showing the relationship between the load and the sensor output voltage in the system.
Figure 6:
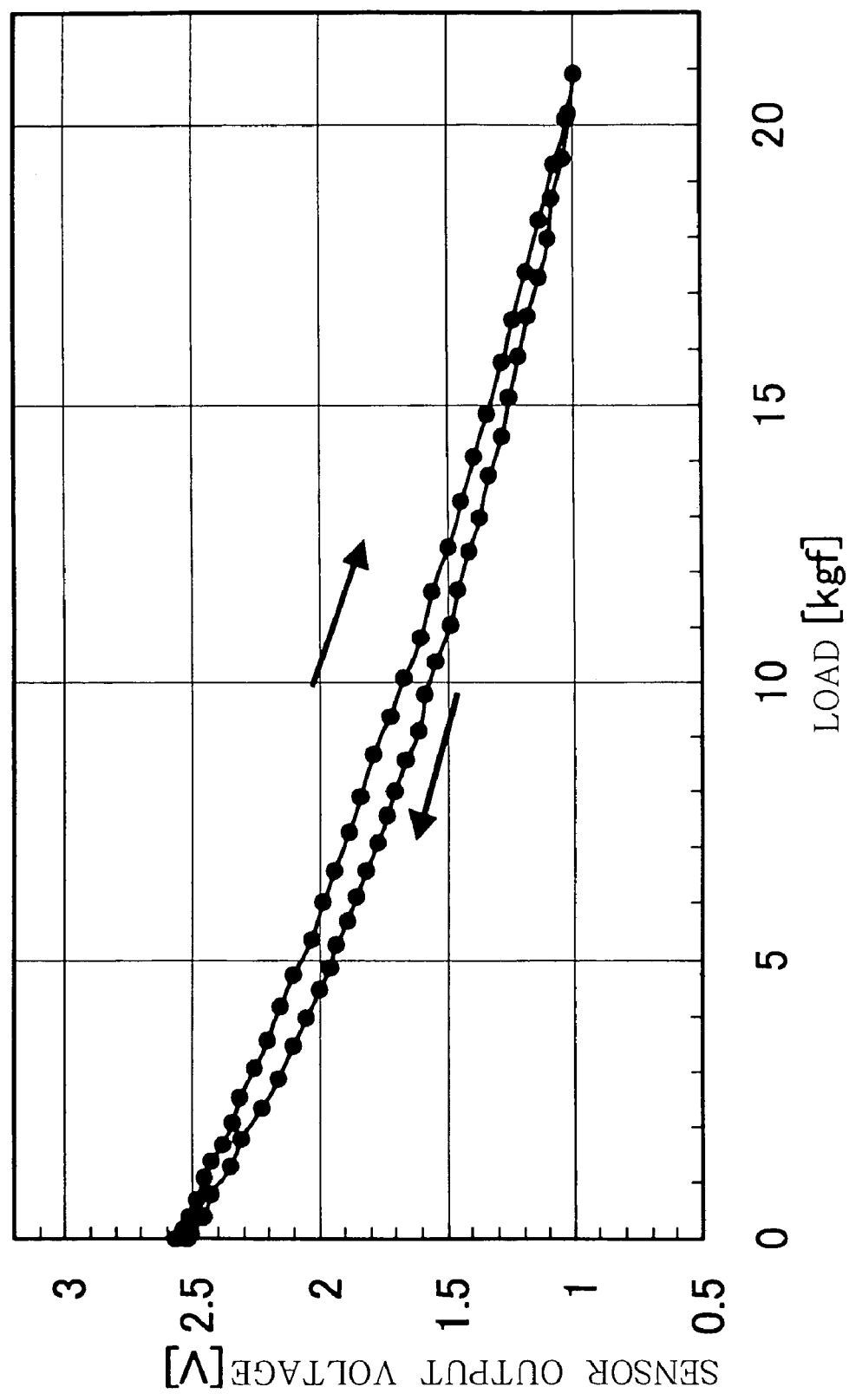
FIG. 6 is a graph showing the relationship between the load and the sensor output voltage in a conventional load detecting system wherein no detection preparing current is supplied.

FIG. 5 shows the output voltage values of the sensor of the load detecting system of the invention at varying loads. Further FIG. 6 shows the sensor output voltage values at varying loads as determined for a conventional system provided by fixedly connecting the change-over circuit shown in FIG. 3 to the terminal A without connecting the circuit to the terminal B by a change-over. The core 83 was provided by a magnetostrictive element in the form of a solid cylinder measuring 3.5 mm in diameter and 6.0 mm in length and prepared by powder metallurgy, while the detecting coil 83 was fabricated by winding an enameled copper wire, 0.23 mm in diameter, 200 turns. The core 85 was subjected to pressure gradually increased from a load of zero kg, i.e., load-free state, to a maximum load of 21 kg and thereafter gradually decreased to the load-free state to measure the sensor output voltage during this process.

FIG. 6 reveals that with the conventional load detecting system, the sensor output voltage curve during the increase of load is greatly out of match with the voltage curve during the decrease of load, indicating the influence of hysteresis. As shown in FIG. 5, on the other hand, the sensor output voltage curve during the increase of load is generally in match with the voltage curve during the decrease of load. This indicates that the influence of the hysteresis is greatly diminished in the load detecting system of the invention.

With the load detecting system of the invention, the pulse current output from the pulse current generating circuit 103 is fed to the detecting coil 85 first to temporarily deform the core 83 in a direction to greatly expand the core. The rectangular-wave voltage output from the exciting circuit 102 is thereafter applied to the detecting coil 85 to detect the load acting on the core 83. Accordingly, the core 83 as expanded to an amount of strain with the load nullified to zero always deforms in the same direction eventually to an amount of strain corresponding to the acting load, regardless of the direction of variation of the load and the magnitude of the load. This eliminates the likelihood that every load detected will involve a variation due to the influence of residual magnetism attributable to hysteresis, consequently enabling the system of the invention to detect the load with high accuracy.

Figure 4:
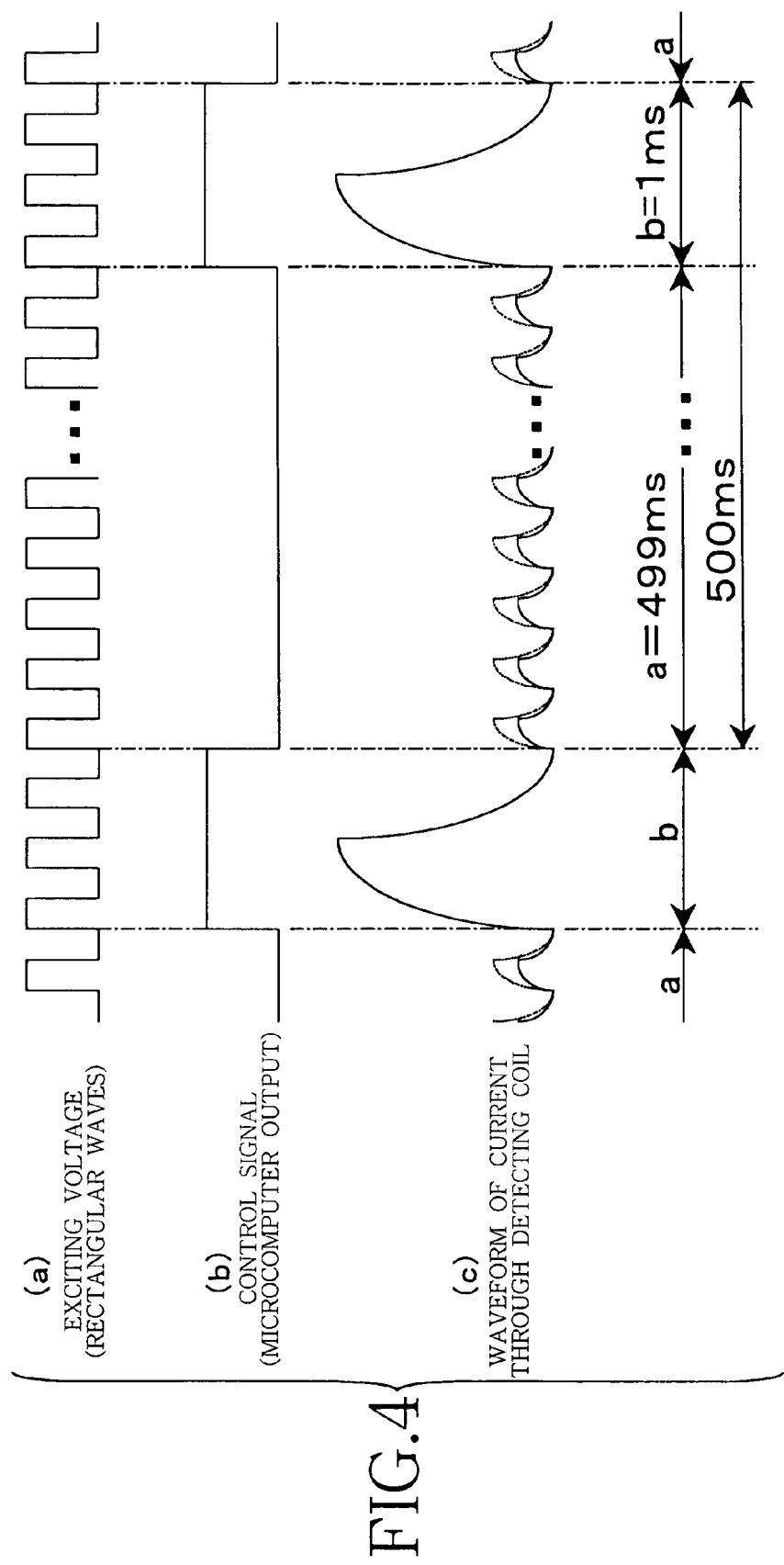
FIG. 4 is a waveform diagram showing the waveforms of exciting voltage (a) and a control signal (b) which are prepared in the system and a current (c) flowing through a detecting coil.

Further with the load detecting system of the invention, the detection preparing current to be passed through the detecting coil 85 has a sawtooth waveform with a convex half waveform rising with a gradual increase and a concave half waveform thereafter falling with a gradual decrease as shown in FIG. 4(*c*), so that the variation in the rate of deformation of the core 83 due to this current is moderate, making it possible to diminish the noise of collision due to abrupt expansion or contraction of the core 83. Since the noise of collision is disagreeable to the user, automatic washing machines incorporating the load detecting system of the invention which is free of the noise are usable with enhanced comfort.

The load detecting system of the invention detects the load based on the current flowing through the detecting coil 85 upon lapse of 20 msec after the fall of the control signal from the microcomputer 100, i.e., upon lapse of a sufficient period of time after the passage of the detection preparing current through the detecting coil 85. Accordingly, the load is detected after the core 83 deformed by the passage of the detection preparing current has resumed an amount of strain corresponding to the load. As a result, the load acting on the core 83 can be detected accurately without being influenced by the waveform of the detection preparing current or the variation of current due to the deformation of the core 83.

Figure 10:
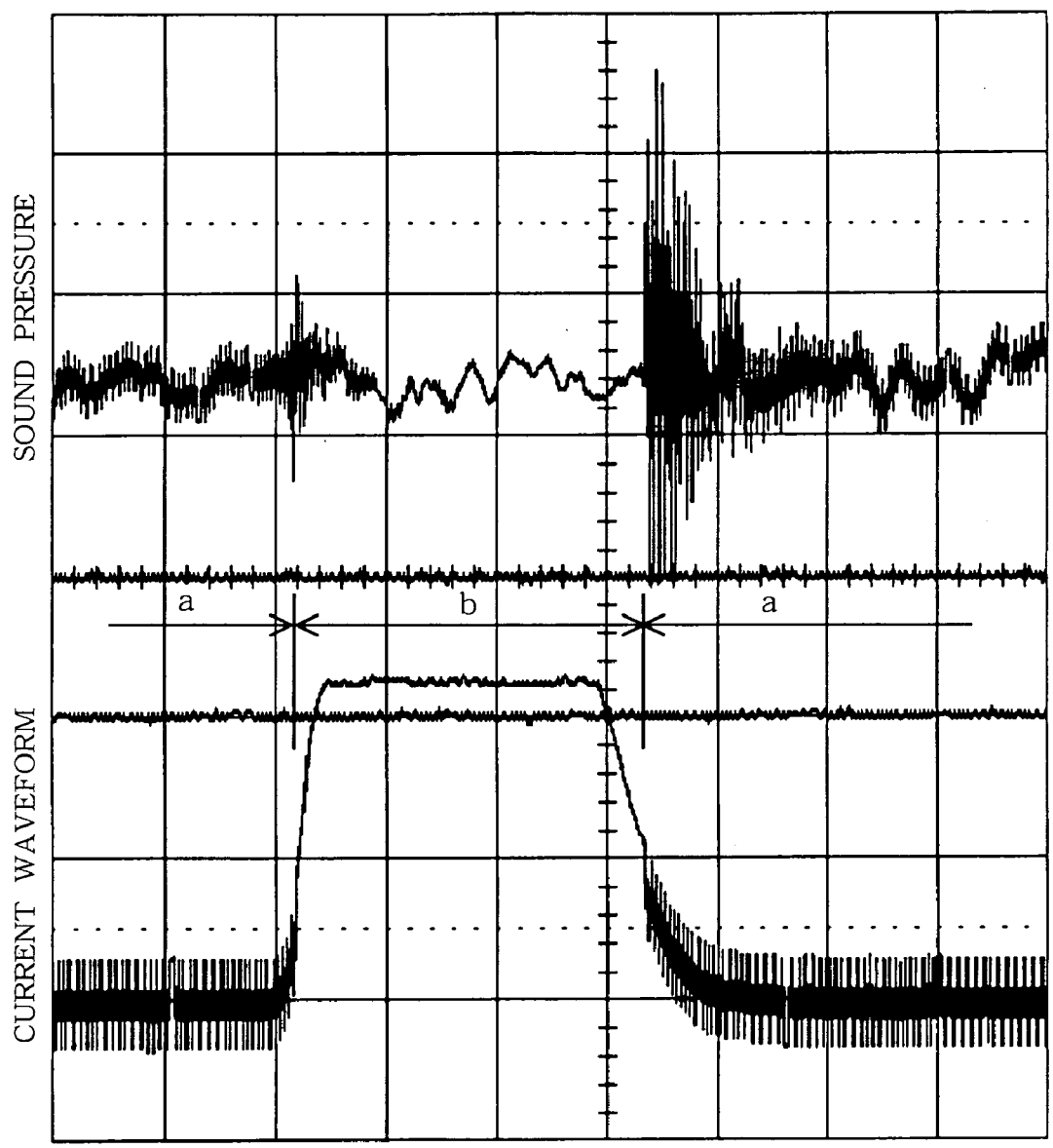
FIG. 10 is a waveform diagram showing the waveform of current flowing through a detecting coil and the waveform of sound pressure produced by the current.

FIG. 10 shows the results obtained by measuring the current flowing through the detecting coil 85 and measuring the ambient sound pressure. As illustrated, a great noise occurs upon the transition of the period b of supply of the detection preparing current to the period a of supply of the detecting current because marked expansion or contraction of the core 83 delivers a force of impact to members around the core to thereby produce a noise of collision.

According to the present embodiment, therefore, the change-over circuit 104 shown in FIG. 1 is so controlled as to pass the detection preparing current through the detecting coil 85 first, then interrupt the supply of current for a specified period of time (for example, for 5 to 10 msec) and thereafter pass the detecting current through the coil.

Figure 11:
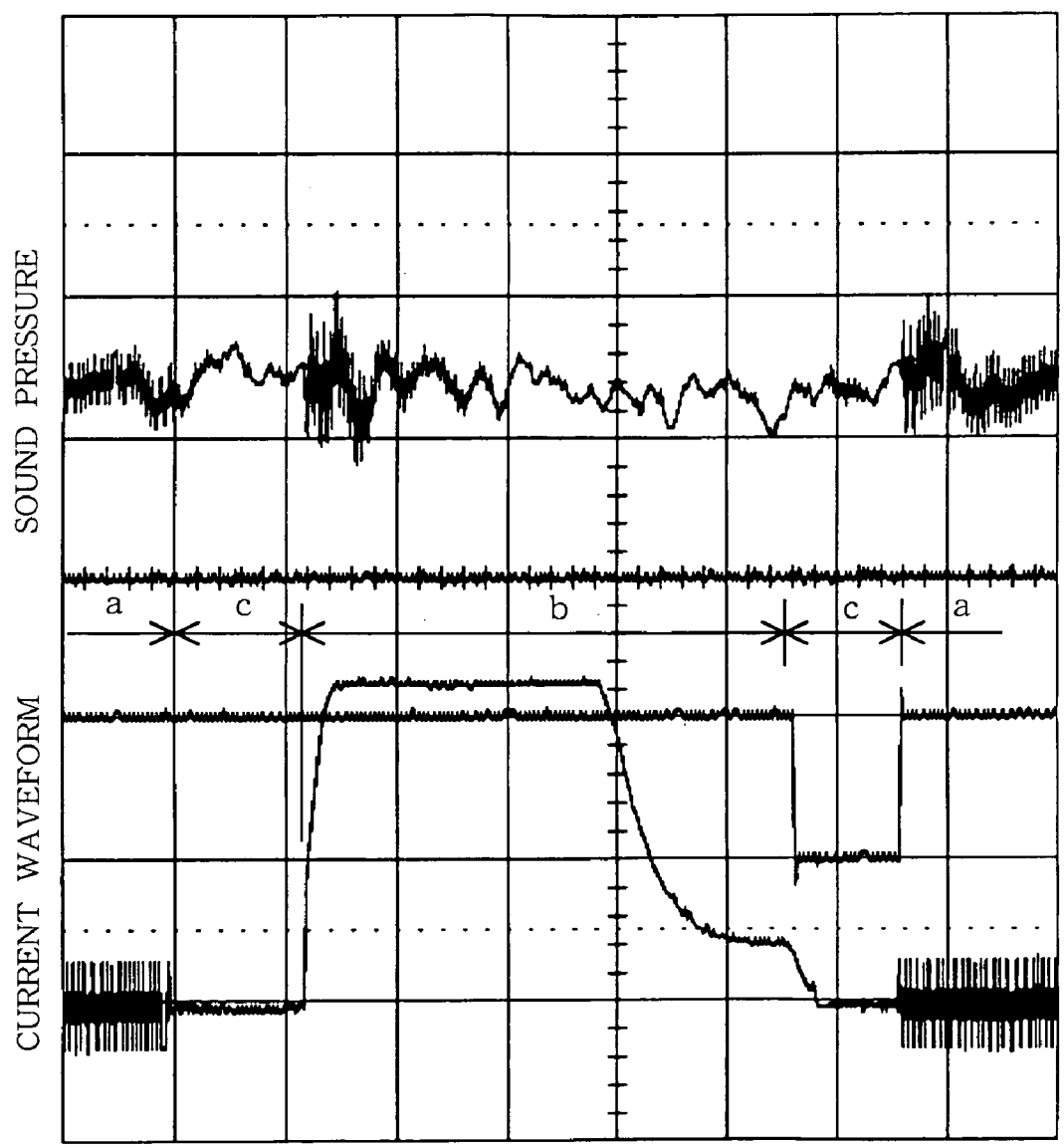
FIG. 11 is a waveform diagram showing the waveform of current flowing through the detecting coil and the waveform of sound pressure produced by the current in the case where a period of interruption of current supply is provided between the duration of passage of the detection preparing current and the duration of passage of detecting current.

FIG. 11 shows the results obtained by measuring the current flowing through the detecting coil 85 and measuring the ambient sound pressure in the case where the above mode of control is resorted to. As illustrated, the completion of the period b of supply of the detection preparing current is followed by a predetermined period c of interruption of current supply and by the period a of supply of the detecting current. This process is free of occurrence of great noise because the marked expansion or contraction of the core 83 is mitigated by the above mode of control to diminish the force of impact to be delivered to the members around the core. It is also effective to provide a period c of interruption of current supply before the passage of the detection preparing current.

In addition to the above mode of control, a capacitor may be interposed between the base and the emitter of the switching element providing the change-over circuit 104 to effect a change-over from the detection preparing current to the detecting current with a given time constant. The occurrence of collision noise can then be suppressed more effectively.

Although the current detecting circuit 105 of the foregoing embodiment comprises a shunt resistor, a Hall element for detecting a magnetic field in accordance with the value of current or a magnetic resistance element may alternatively be used.

Figure 7:
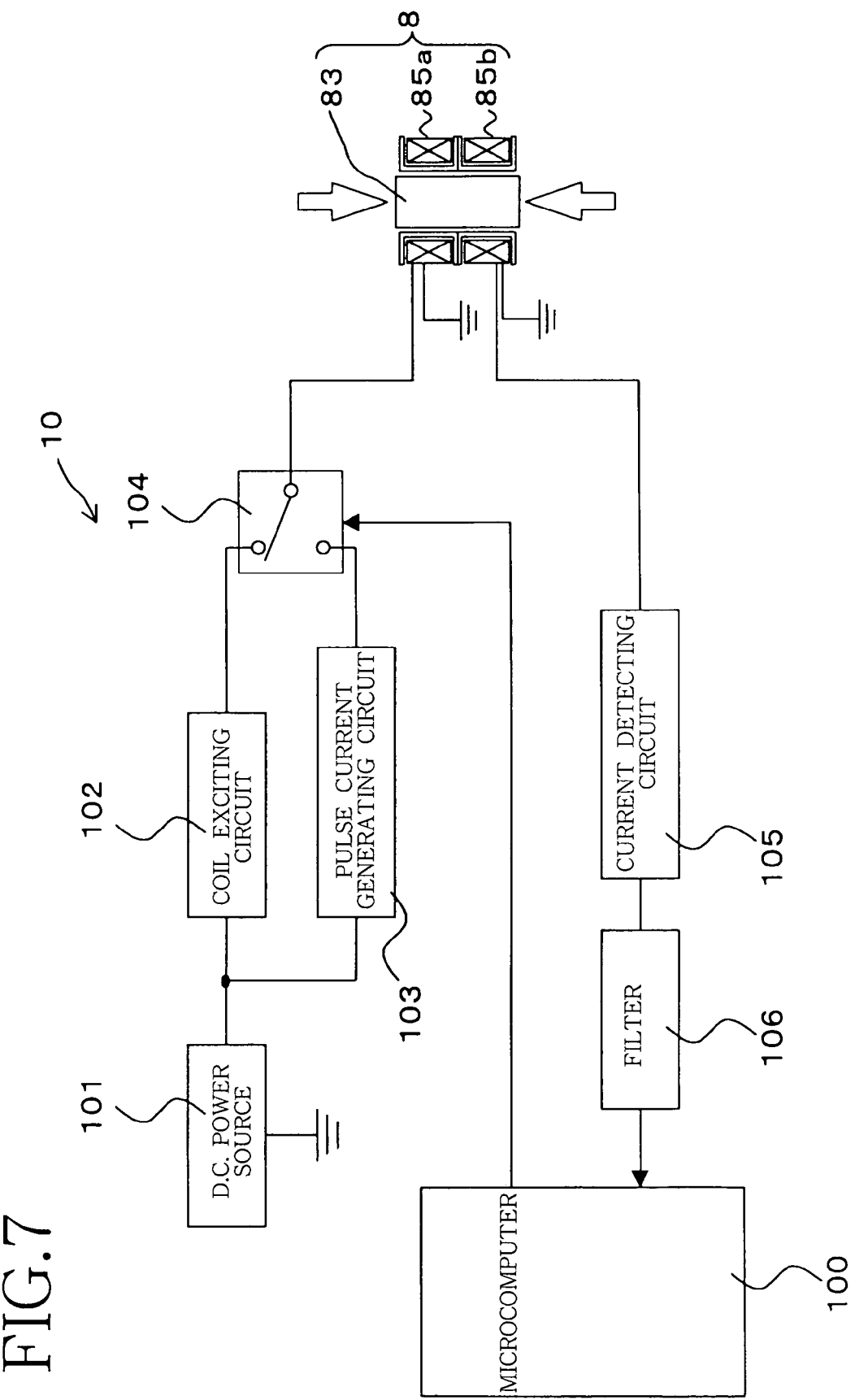
FIG. 7 is a block diagram showing the construction of another load detecting system of the invention.

The detecting coil 85 of the foregoing embodiment comprises a single coil, whereas the coil 85 may comprise a pair of coils 85*a*, 85*b* arranged coaxially as shown in FIG. 7 to pass the detection preparing current and the detecting current through one of the coils, 85*a*, and to detect the current flowing through the other coil 85*b* by the current detecting circuit 105.

Figure 8:
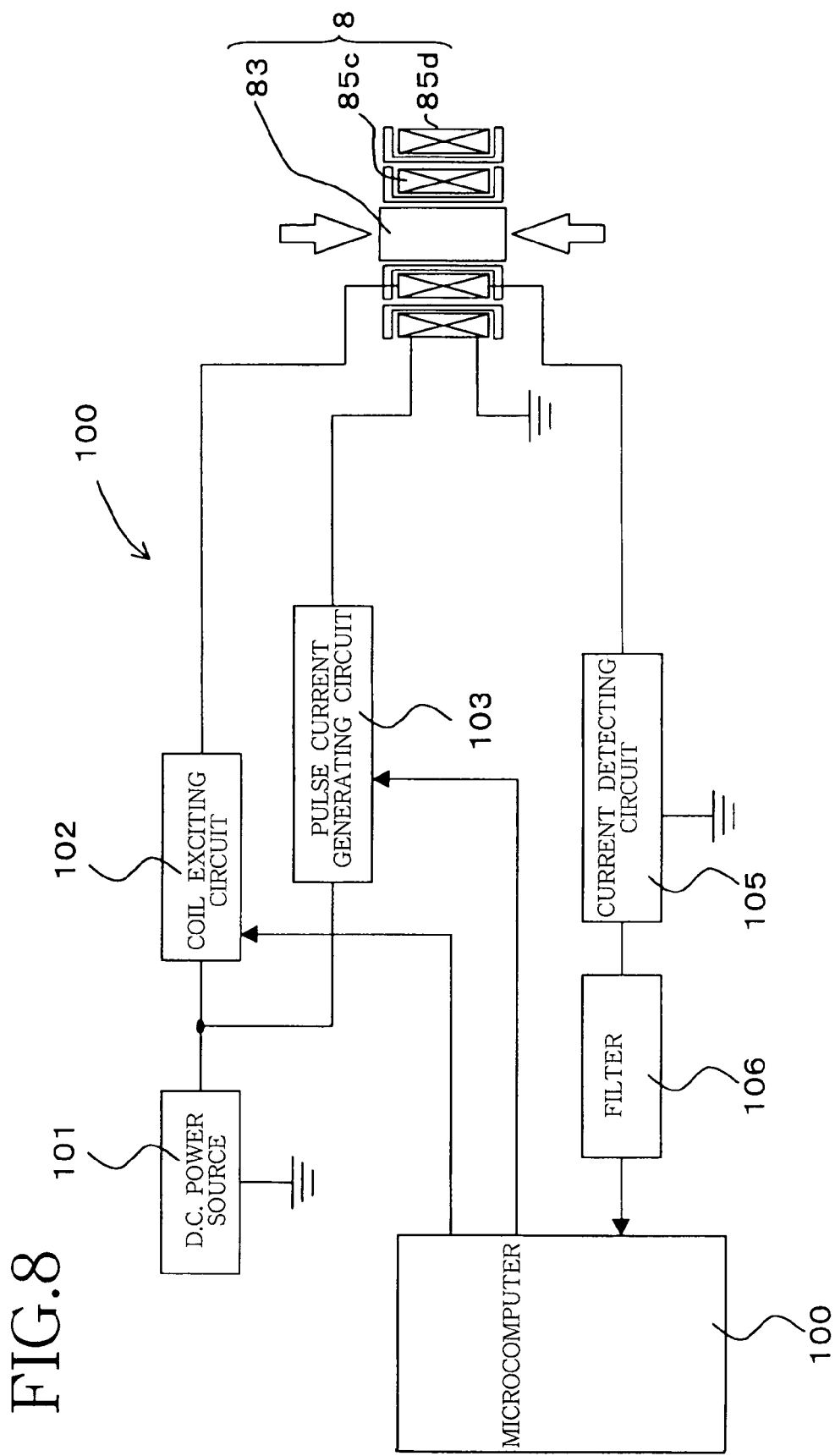
FIG. 8 is a block diagram showing the construction of another load detecting system of the invention.

As shown in FIG. 8, the detecting coil 85 can alternatively be composed of a pair of coils 85*c*, 85*d* arranged in the form of concentric circles. In this case, it is possible to pass the detecting current through one of the coils, 85*c*, detect the current flowing through the coil 85*c* by the current detecting circuit 105 and pass the detection preparing current through the other coil 85*d*.

Figure 9:
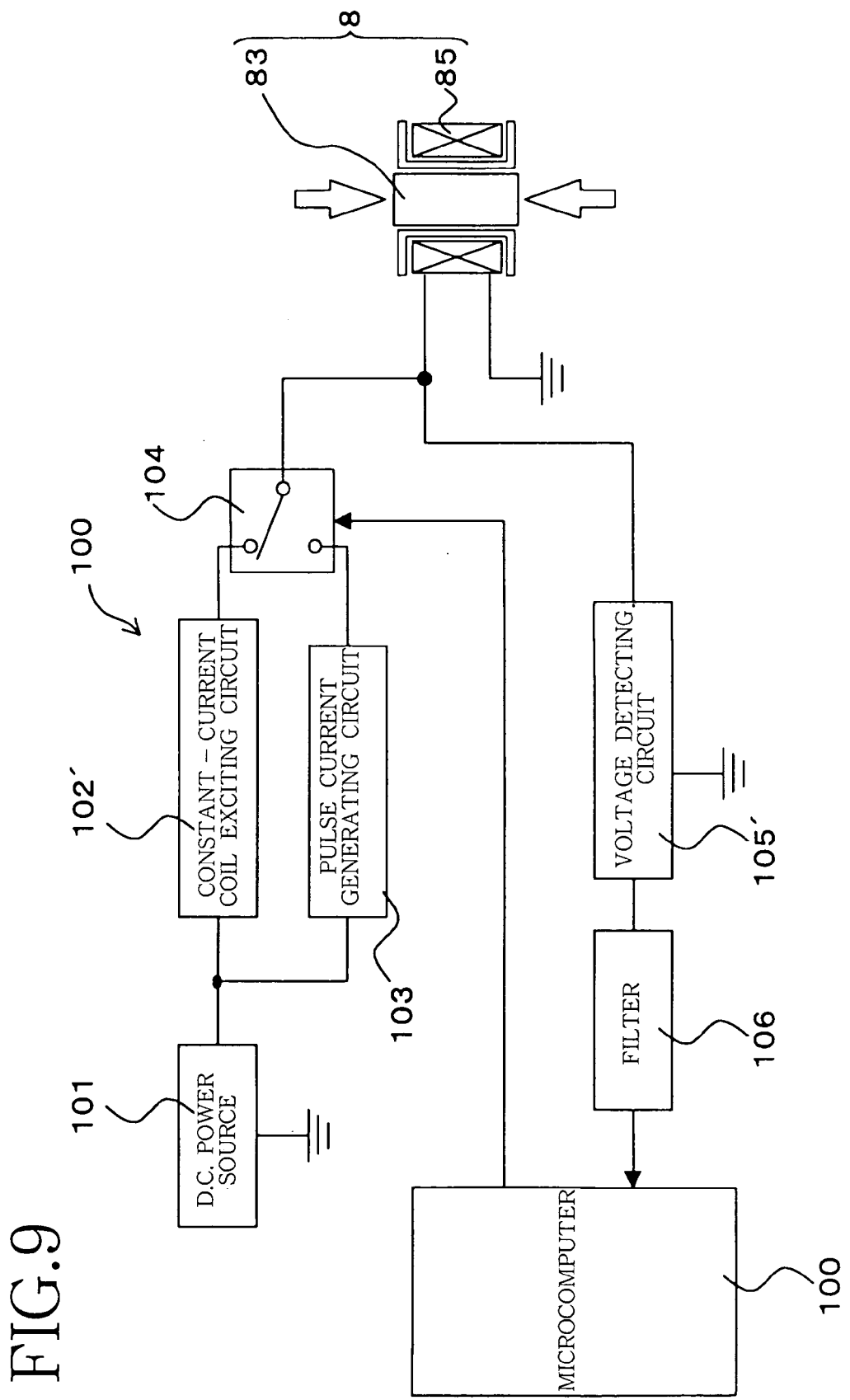
FIG. 9 is a block diagram showing the construction of still another load detecting system of the invention.

The exciting circuit 102 for producing a rectangular-wave voltage is used in the foregoing embodiment for passing the detection preparing current through the detecting coil 85, whereas a constant-current coil exciting circuit 102' shown in FIG. 9 may be used for producing the detection preparing current to be supplied to the detecting coil 85. In this case, a voltage detecting circuit 105' for detecting variations in the voltage across opposite ends of the detecting coil 85 is used in place of the current detecting circuit 105 comprising a shunt resistor.

The waveform of the exciting voltage or current to be supplied to the detecting coil 85 is not limited to rectangular waves but can be sine waves, triangular waves or like pulse waves. The waveform of pulses to be fed to the detecting coil 85 can be any of the rectangular wave, sine wave, triangular wave and trapezoidal wave.

Although a magnetostrictive element having the property to expand when subjected to a magnetic field is used as the core 83, a magnetostrictive element conversely having the property to contract when subjected to a magnetic field may alternatively be used.

The load sensor 8 is disposed between the suspending rod 20 and the casing 1 in the automatic washing machine described, whereas the load sensor 8 may alternatively be positioned between the suspending rod 20 and the outer tub 3.

Interposed between the upper surface of each lower bracket 22 for the suspending rod 2 or 20 and the lower surface of the outer tub bracket 31 is a coil spring 23 which contracts or expands in accordance with the load acting on the outer tub 3, whereby the outer tub 3 is elastically supported with the suspending rod 2, 20 on the casing 1 to absorb the vibration of the outer tub 3 so that the vibration will not be delivered directly to the casing 1.

A load sensor 8 is provided for the suspending rod 20 included among the four rods 2, 20 and positioned between the lower surface of the upper bracket 21 and the upper surface of the casing bracket 11 for detecting the load acting on the outer tub 3. Accordingly, the load acting on the load sensor 8 is approximately a quarter of the actual load on the outer tub 3. The maximum value of the effective detecting range of the load sensor 8 is set at 20 kg, so that the sensor can measure up to a maximum of 80 kg of laundry and washing water in combined weight.

As shown in FIG. 2, the load sensor 8 comprises a solid cylindrical core (magnetostrictive element) 83 of magnetostrictive material, a bobbin 84 fitted around the core 83, and a detecting coil 85 provided around the bobbin 84. An elastic ring 86 of rubber is provided on the upper wall of the bobbin 84, and an elastic ring 87 similarly made of rubber is provided beneath the bottom wall of the bobbin 84.

The core 83, bobbin 84, detecting coil 85 and elastic rings 86, 87 are housed in a cuplike case 81, with a closure 82 provided over an upper opening of the case 81. The closure 82 has a spherical surface for contact with the upper bracket 21 for the rod 20, whereby the load acting on the upper bracket 21 of the rod 20 is received at a point so as to cause the load to act uniformly on the entire end face of the core 83.

With reference to FIG. 1, a bearing 6 is attached to the rear side of the outer tub 3, and a rotary shaft 61 rotatably supported by the bearing has an upper end to which the bottom portion of the inner tub 4 is connected. A pulsator 5 is rotatably provided on the bottom of the inner tub and connected to the rotary shaft 61.

A drive motor 7 is attached also to the rear side of the outer tub 3 and coupled to the pulsator 5 and the inner tub 4 by a belt reeved around pulleys 71, 62 for rotating the pulsator 5 forward and reversely for laundering and rinsing and for rotating the pulsator 5 and the inner tub 4 at a high speed in a definite direction for dewatering.

The detecting coil 85 of the load sensor 8 outputs a signal, which is fed to a control circuit (not shown) for controlling the laundering operation to detect the weight of laundry or the combined weight of laundry and washing water. The laundering operation is controlled based on the result. For example when the automatic washing machine is adapted to launder, rinse and dewater clothes automatically, the load of laundry placed in the inner tub 4 is detected before starting laundering, and an appropriate amount of water for the load is automatically determined. In the subsequent step of pouring water into the outer tub 3, the combined weight including the weight of water placed into the outer tub 3 is detected, and the supply of water is discontinued automatically based on the result when the predetermined appropriate amount of water has been placed in. Further in dehydrating or dewatering the laundry, the weight of the laundry in the inner tub 4 is detected to detect the dewatered state of the laundry from the weight to automatically set an appropriate period of dewatering time in accordance with the state.

Next, the construction of the load detecting circuit 10 to be connected to the load sensor 8 will be described. As shown in FIG. 3, the load detecting circuit comprises a d.c. power source 101, an exciting circuit 102 and a pulse current generating circuit 103 which are connected to the output terminal of the power source 101, a change-over circuit 104 comprising a switching element for selectively changing the current to be supplied to the detecting coil 85, a current detecting circuit 105 connected to the output terminal of the detecting coil 85, and a microcomputer 100 connected to the output terminal of the current detecting circuit 105 via a filter 106.

The exciting circuit 102 is adapted to produce a rectangular-wave voltage [see FIG. 4(a)] which goes on and off with a frequency of 16 kHz from a 5-V d.c. current delivered from the power source 101. The pulse current generating circuit 103 produces a pulse current with a peak value of 800 mA based on a control signal [see FIG. 4(b)] from the microcomputer 100. The peak value of the pulse current to be output from the circuit 103.

The microcomputer 100 includes a memory (not shown) having stored therein the relationship between the load acting on the core 83 and the output voltage value of the A/D converter 107, as expressed in the form of a function or table. Accordingly, the load acting on the core 83 is derived from the output value of the A/D converter 107 based on the relationship.

FIG. 5 shows the output voltage values of the sensor of the load detecting system of the invention at varying loads. Further FIG. 6 shows the sensor output voltage values at varying loads as determined for a conventional system provided by fixedly connecting the change-over circuit shown in FIG. 3 to the terminal A without connecting the circuit to the terminal B by a change-over. The core 83 was provided by a magnetostrictive element in the form of a solid cylinder measuring 3.5 mm in diameter and 6.0 mm in length and prepared by powder metallurgy, while the detecting coil 85 was fabricated by winding an enameled copper wire, 0.23 mm in diameter, 200 turns. The core 83 was subjected to pressure gradually increased from a load of zero kg, i.e., load-free state, to a maximum load of 21 kg and thereafter gradually decreased to the load-free state to measure the sensor output voltage during this process.

FIG. 6 reveals that with the conventional load detecting system, the sensor output voltage curve during the increase of load is greatly out of match with the voltage curve during the decrease of load, indicating the influence of hysteresis. As shown in FIG. 5, on the other hand, the sensor output voltage curve during the increase of load is generally in match with the voltage curve during the decrease of load. This indicates that the influence of the hysteresis is greatly diminished in the load detecting system of the invention.

With the load detecting system of the invention, the pulse current output from the pulse current generating circuit 103 is fed to the detecting coil 85 first to temporarily deform the core 83 in a direction to greatly expand the core. The rectangular-wave voltage output from the exciting circuit 102 is thereafter applied to the detecting coil 85 to detect the load acting on the core 83. Accordingly, the core

What is claimed is:

1. A load detecting system comprising a magnetostrictive element to be acted on by a load to be measured, a coil disposed in the vicinity of the magnetostrictive element, and a detecting circuit connected to the coil for detecting the magnitude of the load acting on the magnetostrictive element, the load detecting system being characterized in that the detecting circuit comprises:

detecting means for passing an a.c. detecting current through the coil, detection preparing means for passing through the coil a detection preparing current having a current value greater than a maximum value of the detecting current and a convex half waveform rising with a gradual increase and a concave half waveform thereafter falling with a gradual decrease and a maximum value of the current value at a level equivalent to or greater than a current value for altering the amount of strain of the magnetostrictive element at a maximum value of the effective load detecting range of the system to the amount of strain at a minimum value thereof, control means for controlling the detecting means and the detection preparing means to pass the detecting current through the coil after passing the detection preparing current therethrough, and calculation processing means for deriving the magnitude of the load acting on the magnetostrictive element based on an impedance variation produced in the coil during the period of passage of the detecting current through the coil.

2. A load detecting system comprising a magnetostrictive element to be acted on by a load to be measured, a coil disposed in the vicinity of the magentostricitve element, and a detecting circuit connected to the coil for detecting the magnitude of the load acting on the magnetostrictive element, the load detecting system being characterized in that the detecting circuit comprises:

detecting means for passing an a.c. detecting circuit through the coil;

detection preparing means for passing through the coil a detection preparing current having a current value greater than a maximum value of the detecting current and a convex half waveform rising with a gradual increase and a concave half waveform thereafter falling with a gradual decrease, control means for controlling the detecting means and the detection preparing means to pass the detecting current through the coil after passing the detection preparing current threrethrough, and calculation processing means for deriving the magnitude of the load acting on the magnetistrictive element based on an impedance variation produced in the coil during the period of passage of the detecting current through the coil.

3. A load detecting system according to claim 1 or 2 wherein the detecting means comprises current generating means for producing the detecting current to be passed through the coil.

4. A load detecting system according to claim 3 wherein the detecting current is in the form of pulse waves pulsating with a specified period.

5. A load detecting system according to claim 1 or 2 wherein the detecting means comprises voltage generating means for producing detecting voltage for passing the detecting current through the coil.

6. A load detecting system according to claim 5 wherein the detecting voltage is in the form of pulse waves pulsating with a specified period.

7. A load detecting system according to claim 1 or 2 wherein the calculation processing means derives the magnitude of the load acting on the magnetostrictive element based on the impedance variation of the coil upon lapse of a predetermined period time after the passage of the detecting preparing current through the coil.

8. A load detecting system according to claim 1 or 2 wherein the control means passes the detection preparing current through the coil, then interrupts the passage of the current for a specified period of time and thereafter passes the detecting current through the coil.

9. A load detecting system according to claim 1 or 2 wherein the detection preparing current is changed over to the detecting current by the control means with a specified time constant.

* * * * *